United States Patent Office 3,361,628
Patented Jan. 2, 1968

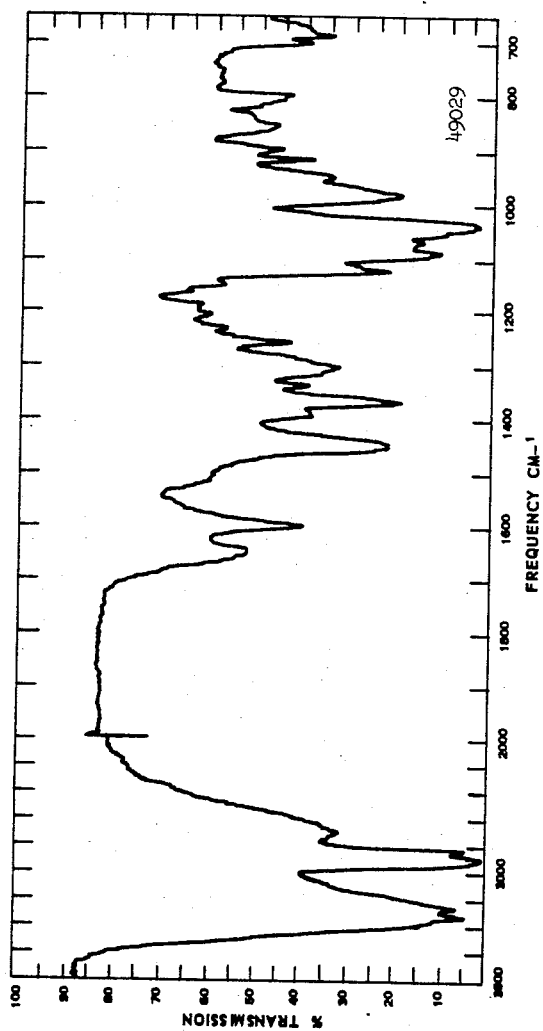

3,361,628
ETHYL THIOLINCOSAMINIDE AND PROCESS FOR PRODUCING THE SAME
Alexander D. Argoudelis, Kalamazoo, and William Schroeder, Pavilion Township, Kalamazoo County, Mich., assignors to The Upjohn Company, Kalamazoo, Mich., a corporation of Delaware
Filed May 22, 1964, Ser. No. 369,517
8 Claims. (Cl. 167—65)

ABSTRACT OF THE DISCLOSURE

Ethyl thiolincosaminide, a basic compound, which is produced by hydrozinolysis of lincomycin C, an antibiotic. Lincomycin C is produced when an ethionine is added to a fermentation using the microorganism *Streptomyces lincolnensis* var. *lincolnensis*. Ethyl thiolincosaminide forms salts with penicillin. These salts are useful in the isolation and purification of penicillin, particularly benzyl penicillin.

---

This invention relates to a novel composition of matter and to a process for the preparation thereof, and is more particularly directed to the novel compound which has been given the trivial name ethyl thiolincosaminide (abbreviated to ETL) and to a process for producing the same.

Ethyl thiolincosaminide (U-15140) is obtained by hydrazinolysis of lincomycin C (U-11,921A), a new antibiotic. Lincomycin C, as the free base or as an acid addition salt, is brought into contact with hydrazine, advantageously as the hydrate, until substantial hydrazinolysis is obtained. The hydrazinolysis takes place at room temperature (25–35° C.) but higher or lower temperatures from about 0 to 130° C. can be used. The proportions of lincomycin C and hydrazine can be varied but at least the stoichiometric amount of hydrazine is necessary to effect complete hydrazinolysis. Advantageously, an excess of hydrazine is used as a solvent for the reaction.

Ethyl thiolincosaminide exists either in the non-protonated (free base) form or the protonated (salt) form depending upon the pH of the environment. It forms stable protonates (acid addition salts) by neutralization of the free base with an acid or by metathesis between the protonated form of ETL and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methyl glutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's azobenzenesulfonic, octadecylsulfuric, picric, and like acids. These acid addition salts are useful in upgrading the free base. ETL also forms salts with penicillin. These salts have solubility characteristics which cause them to be useful in the isolation and purification of penicillins, particularly benzyl penicillin.

Ethyl thiolincosaminide is useful for the resolution of racemic acids. For example, ETL can be reacted with racemic acids to form diastereoisomeric acid addition salts which can be separated by fractional crystallization into diastereoisomers from which the optically active acids can be regenerated. ETL also is useful as an intermediate. It reacts with isocyanates to form urethanes and ureas, and can be used to modify polyurethane resins. For example, it can be reacted with an excess of toluene diisocyanate to form a prepolymer which can then be reacted with the polyol ethers and polyol esters commonly used to form polyurethanes; or ETL can be mixed with the polyol compound and the mixture then reacted with toluene diisocyanate. ETL can also be reacted with ethylene oxide, propylene oxide, and like alkylene oxides to form polyoxyalkylene ETL which can be reacted with toluene diisocyanate to form a polyurethane. ETL is particularly useful for producing rigid polyurethane foams. It also condenses with formaldehyde according to U.S. Patents 2,425,320 and 2,606,155, especially when the thiocyanic acid addition salt is employed, to form polymers which are useful as pickling inhibitors. Its fluosilicic acid addition salt is also useful as a mothproofing agent in accordance with U.S. Patents 1,915,334 and 2,075,359.

The following example is illustrative of the process and products of the present invention but is not to be construed as limiting. All percentages are by weight and all solvent mixture proportions are by volume unless otherwise noted.

PREPARATION OF LINCOMYCIN C

Fermentation

A soil slant of *Streptomyces lincolnensis* var. *lincolnensis*, NRRL 2936, was used to inoculate a series of 500-ml. Erlenmeyer flasks each containing 100 ml. of seed medium consisting of the following ingredients:

|  | G. |
|---|---|
| Yeastolac [1] | 10 |
| Glucose monohydrate | 10 |
| N-Z-amine B [2] | 5 |
| Tap water, q.s. 1 liter. |  |

[1] Yeastolac is a protein hydrolysate of yeast cells.
[2] N-Z-amine B is Cheffield's enzymatic digest of casein.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| Glucose monohydrate | gm__ | 15 |
|---|---|---|
| Starch | gm__ | 40 |
| Molasses | gm__ | 20 |
| Wilson's Peptone Liquor No. 159 [1] | gm__ | 10 |
| Corn steep liquor | gm__ | 20 |
| Calcium carbonate | gm__ | 8 |
| Lard oil | ml__ | 0.5 |
| Tap water, q.s. 1 liter. | | |

[1] Wilson's Peptone Liquor No. 159 is a preparation of enzymatically hydrolyzed proteins from animal origin.

At the time of inocuation, DL-ethionine was added to a final concentration of 2 mg./ml.

The shake flasks were harvested after 4 days of fermentation at 28° C. on a Gump rotary shaker at 250 r.p.m. They assayed at 200 mcg./ml. on the *S. lutea* assay, hereinafter described. The whole beer solids was about 20 gm./liter.

In a similar manner, fermentations were run with L-ethionine substituted for DL-ethionine, and D-ethionine substituted for DL-ethionine.

Purification

Whole beer (235 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 liters of water and the water wash was discarded. The cake was washed with 70 liters of 20% aqueous acetone and the 20% aqueous acetone wash was discarded. The cake was then eluted twice with 100 liter portions of 90% aqueous acetone. The eluates were combined (215 liters) and the solution was concentrated (18 liters). This concentrate was adjusted to pH of 10.0 with a 50% aqueous sodium hydroxide solution and extracted three times with 20 liter portions of methylene chloride. The methylene chloride extracts were combined (60 liters) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 liters of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. (The assay against *Sarcina lutea* is conductted on agar buffered to pH 6–8 with pH 7.0 phosphate buffer [0.1 M]. A unit volume [0.08 ml.] of solution containing the material to be assayed is placed on a 12.7 ml. assay disc which is then placed on an agar plate seeded with the assay microorganism.) Thin layer chromatography showed the presence of both lincomycin hydrochloride and lincomycin C hydrochloride in approximately equal amounts.

Crude lincomycin C hydrochloride (7.0 g.) was dissolved in 20 ml. of water and 20 ml. of butanol, pH adjusted to 4.2 with 1 N HCl, and the solution distributed in a counter current distribution apparatus for 1000 transfers. Analysis by thin-layer chromatography showed that the fractions in tubes 135 to 190 contained lincomycin C. These fractions were combined, and the solution was concentrated to an aqueous and freeze dried to give 2.44 gm. of lincomycin C hydrochloride assaying 1400 mcg./mg. against *Sarcina lutea*. Five hundred mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hr. Crystalline (cubes) lincomycin C hydrochloride was separated from the supernatant material solution by decantation. These crystals were recrystallized from one ml. of water, one ml. of methanol, 80 ml. of acetone and 20 ml. of ether; yield, 250 mg. of crystalline (cubes) lincomycin C hydrochloride. The supernatant obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride.

EXAMPLE 1

Ethyl thiolincosaminide

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pages 88 and 97 of Kunin, Ion Exchange Resins, 2nd ed., [1958], John Wiley & Sons, Inc., polystyrene cross-linked, if desired, with divinylbenzene, prepared by the procedure given on page 84 of Kunin, supra, and quaternized with trimethylamine or dimethylethanolamine, by the procedure given on page 97 of Kunin, supra.) The alkaline solution was then freeze dried to a residue which was dissolved in 50 ml. of hydrazine hydrate (98–100%) and refluxed for 24 hours. The solution was then concentrated to dryness in vacuo and the residue triturated three times with 10 ml. portions of acetonitrile. The insoluble material was collected and dried; yield 900 mg. A solution of 600 mg. of the dried insoluble material in 4 ml. of dimethylformamide (heat was used to promote solution) was then clarified by filtration and the filtrate was held at room temperature for 4 hours. The crystalline ethyl thiolincosaminide which precipitated was isolated by filtration, washed with ether and dried; yield 500 mg.

Ethyl thiolincosaminide has the following physical and chemical characteristics:

Melting point: 191–195° C.
Optical rotation: $[\alpha]_D^{25}$ +258° (c., 0.76 in water),
Titration: $pKa'=7.17$.
IR absorption spectrum in mineral oil mull (shown in FIGURE I of the drawing):

| Cm.$^{-1}$ band: | Intensity |
|---|---|
| 3340 | S |
| 3275 | S |
| 2950 | (oil) S |
| 2920 | (oil) S |
| 2850 | (oil) S |
| 2710 | M |
| 1689 | W |
| 1654 | M |
| 1605 | M |
| 1513 | W |
| 1453 | S |
| 1400 | M |
| 1375 | S |
| 1345 | M |
| 1309 | M |
| 1264 | M |
| 1239 | M |
| 1214 | W |
| 1199 | W |
| 1170 | W |
| 1154 | M |
| 1129 | S |
| 1094 | S |
| 1074 | S |
| 1045 | S |
| 989 | S |
| 955 | M |
| 924 | M |
| 904 | M |
| 860 | M |
| 843 | M |
| 804 | M |
| 778 | W |
| 758 | W |
| 704 | M |
| 692 | M |
| 679 | M |
| 674 | M |

*Elemental analysis.*—Calculated for $C_{10}H_{21}NO_5S$: C, 44.98; H, 7.93; N, 5.25; S, 12.01; O, 29.96. Found: C, 44.09; H, 7.91; N, 5.24; S, 11.32.

Molecular weight: 271 (determined by titration).

We claim:
1. Ethyl thiolincosaminide, which in its essentially pure crystalline form
   (a) has a molecular weight of 271 as determined by titration;
   (b) has an optical rotation of $[\alpha]_D^{25}=+258°$ (c., 0.76 in water);
   (c) has the following elemental analysis: C, 44.09; H, 7.91; N, 5.24; S, 11.32, and
   (d) has a characteristic infrared absorption spectrum as shown in FIGURE I of the drawing.
2. Ethyl thiolincosaminide, as defined in claim 1, in its essentially pure form.
3. Ethyl thiolincosaminide, according to claim 1, in its essentially pure crystalline form.
4. The acid addition salts of ethyl thiolincosaminide, as defined in claim 1.

5. The hydrochloride of the compound as defined in claim 1.

6. The compound of claim 5 in its essentially pure crystalline form.

7. A process which comprises the hydrazinolysis of lincomycin C with a stoichiometric amount of hydrazine at a temperature of about 0 to 130° C. to form ethyl thiolincosaminide.

8. A process which comprises the hydrazinolysis of lincomycin C with a stoichiometric amount of hydrazine hydrate at reflux for 24 hrs. to form ethyl thiolincosaminide and isolating the ethyl thiolincosaminide.

References Cited

UNITED STATES PATENTS 3,086,912   4/1963   Bergy et al. _____ 167—65

ALBERT T. MEYERS, *Primary Examiner.*

D. M. STEPHENS, *Assistant Examiner.*